United States Patent

Dame, Jr. et al.

[15] 3,647,474

[45] Mar. 7, 1972

[54] SNACK FOOD PRODUCT AND PROCESS
[72] Inventors: Charles Dame, Jr., Wheaton, Ill. 68187; William S. Stinson, Jr., New City, N.Y. 10956; Anthony C. Capossela, North Tarrytown, N.Y. 10591
[73] Assignee: General Foods Corporation, White Plains, N.Y.
[22] Filed: Oct. 30, 1969
[21] Appl. No.: 872,758

[52] U.S. Cl. ................................................99/83
[51] Int. Cl. ................................................A23l 1/10
[58] Field of Search ..........................99/80, 81, 83
[56] References Cited

UNITED STATES PATENTS 3,348,950  10/1967  Weiss.....................................99/80 R
3,174,864  3/1965  Schiebel ..................................99/81
3,027,258  3/1962  Markakis et al. .........................99/81
3,076,711  2/1963  Gerkens...................................99/100

Primary Examiner—Raymond N. Jones
Attorney—Thomas V. Sullivan and Bruno P. Struzzi

[57] ABSTRACT

A snack food product comprises popped popcorn in a dough matrix containing tapioca flour, corn flour and potato starch and is deep fat fried. The snack food product contains sucrose and an alkali metal bicarbonate which serve to improve the stability of the deep fat fried snack food product as well as to enhance the flavor thereof. The process for preparing the snack food is also described.

9 Claims, No Drawings

SNACK FOOD PRODUCT AND PROCESS

This invention relates to a snack food product and to a process for preparing the same.

In recent years snack food products of many types have become widely available. These products take many forms such as chips, puffs, curls and the like and, depending upon the base such as, for example, potato, corn and the like which is employed and the flavoring adjuncts which are added, have widespread appeal for a variety of consumer tastes. A particularly attractive and appealing snack food product is described and claimed in copending application Ser. No. 765,679, filed Oct. 7, 1968, in which one of us is also a joint inventor. While the product of the just-referred-to application has numerous advantages from the viewpoint of texture, taste and appearance, it has been found that the stability of the product may, in many instances, be less than optimum. It would appear that because of deep fat frying of the product, there is a tendency for oxidative and/or hydrolytic rancidity to be encountered when the product is subject to accelerated storage conditions unless the product is specially packaged in an inert atmosphere such as nitrogen. Although stability is a problem with many deep fat fried snack food products because of their high fat or oil content, which is usually in the range of about 30 to 40 percent, it seems that a popcorn base snack food product may be more prone to encounter stability problems. Whether this is due to a large amount of surface area of the product since it contains comminuted popcorn or whether it is attributable to components in the dough matrix in which the popcorn is incorporated or whether it is because the oils and possibly naturally occurring antioxidants in the popcorn itself are breaking down during heating is not completely known. In any event, a need does exist for improving the storage life and acceptability of deep fat fried snack food products, particularly popcorn-containing snack food products.

It is therefore an object of this invention to provide snack food products comprising popped popcorn in a dough matrix containing tapioca flour, corn flour and potato starch having improved stability.

It is a further object of this invention to provide a snack food product comprising comminuted popped popcorn in a cooked dough matrix containing tapioca flour, corn flour and potato starch having extended storage life and acceptability without having to resort to expensive gas-packaging techniques.

Another object of this invention is to prepare a deep fat fried snack food product comprising comminuted popped popcorn in a cooked dough matrix containing tapioca flour, corn flour and potato starch and flavor and stability improving ingredients which are present in specifically defined amounts with the result that a product having unique texture, appearance, flavor and stability is obtained.

A still further object of this invention is to provide a process for preparing a deep fat fried popcorn-containing snack food product.

Yet another object of this invention is to provide a process for improving the stability of a deep fat fried popcorn-containing snack food product.

The foregoing objects and others are realized by incorporating popped popcorn in a dough matrix containing tapioca flour, corn flour and potato starch and including in the matrix sucrose and an alkali metal bicarbonate. Surprisingly, it has been discovered that by including sucrose and an alkali metal bicarbonate in the matrix, not only is the flavor of the snack product enhanced, but more importantly the storage life and thus the acceptability of the snack product is considerably improved. Thus, as contrasted with a similar snack food product which contains no sucrose and no alkali metal bicarbonate, the snack food product of this invention has its stability increased to 9 to 10 weeks under accelerated storage conditions without oxidative and/or hydrolytic rancidity becoming apparent.

It further appears that conjoint use of sucrose and alkali metal bicarbonate is essential for obtaining the desired stability. For example, if sucrose is omitted or is substituted for by another sugar, the requisite stability does not seem to be achieved. Similarly, if the alkali metal bicarbonate is omitted or is replaced by another edible base such as an alkali metal carbonate, phosphate, or hydroxide, long term stability is again not evident. In addition to the conjoint use of sucrose and an alkali metal bicarbonate, it appears that their amounts, based upon the weight of the dough matrix, are critical. Typically, an amount of sucrose is employed in a weight ratio of from about 1 to 3 to about 1 to 10 based on the dough matrix and preferably a weight ratio of 1 to 5 is used. The weight ratio of alkali metal bicarbonate to the dough matrix may be varied from about 1 to 25 to about 1 to 50 and a preferred weight ratio is 1 to 40. While any one or a mixture of sodium bicarbonate, potassium bicarbonate or ammonium bicarbonate may be used, it is preferred to use sodium bicarbonate.

The sucrose and alkali metal bicarbonate are generally blended with the ingredients making up the dough before the dough matrix is cooked. However, the stability improving ingredients may also be added to the matrix after it is being cooked to gelatinize the flours and starches but prior to a latter stage in the process when the snack is cooked further by deep fat frying.

The popped popcorn may be whole or comminuted. While mixtures of various flours may be utilized, tapioca flour and corn flour are preferred. Similarly, although edible starches of many types may be used, potato starch is preferred. The dough matrix is preferably cooked before the popped popcorn is admixed therewith and the ratio of the popped popcorn to the matrix on a dry weight basis may range from about 1 to 1 to 3 to 1. Following incorporation of the popped popcorn in the cooked dough matrix, the mixture is shaped and formed, cooled and dried. The dried product may be shipped and stored in such form for subsequent final cooking. Alternatively, the dried product may be cooked as the final step of the process by immersing it in hot oil using conventional deep fat frying techniques.

As indicated hereinbefore, the dough matrix of the snack food product of this invention contains a mixture of flours and starch. Although flours obtained from a variety of cereals, grains and tubers may be readily employed, it has been found that the combination of tapioca flour and corn flour provides a snack food product with very desirable flavor, texture and appearance characteristics. Thus, while flours such as rice, oat, wheat and the like may be used in minor amounts, it has been found that tapioca flour results in good texture in the final product and has the advantage of permitting puffing during deep fat frying which is also advantageous. Moreover, because of its bland flavor, tapioca flour generally does not mask the flavor impact of the other principal ingredients of the snack food product. The use of corn flour is advantageous in that since popcorn is an essential ingredient of the snack food product, corn flour provides, together with popcorn, an overall predominating corn flavor and texture. Although corn puff and corn chips are well known, such products are usually prepared from corn grits and/or corn masa flour which, while they may be used in minor amounts in the matrix of the snack food product of this invention, are not as essential as corn flour. Further, even though it is possible to employ any one or more of a large number of food starches, such as waxy maize, corn, rice, tapioca and the like, it has been surprisingly found that potato starch, more particularly a pregelatinized potato starch, provides extremely desirable characteristics in the snack food product.

In making the dough matrix, it has been found advantageous to employ the preferred combination of starches and flours within a certain range. Thus, the use of a ratio of about 1 to 1 to 1 of tapioca flour to corn flour to potato starch has been noted to furnish very desirable flavor, texture and appearance characteristics in the final snack food product.

Popped popcorn may be incorporated into the dough matrix, preferably after the matrix has been cooked to gelatinization temperatures. The popcorn may be either whole or comminuted, that is, discrete exploded kernels may be used or popcorn which has been chopped, sliced, ground or otherwise subdivided, may be employed. It has been found advantageous to use a ratio of popped popcorn to dough matrix ranging from about 1 to 1 to about 3 to 1, preferably 2 to 1, on a dry weight basis. It appears that with lower ratios of popped popcorn to dough matrix, fat pickup during final processing, e.g., in deep fat frying, may be excessive. The use of comminuted popped popcorn is especially desirable since the final snack product is seen to be somewhat less fragile and in-processing difficulties are avoided because of the higher density of the comminuted popped popcorn.

In making the dough matrix, the ingredients of flours and starch are preblended and then introduced to a suitable cooking vessel containing water. The preblend may contain other ingredients such as sucrose and alkali metal bicarbonate and salt and other flavor adjuncts but it is obvious that such ingredients may be incorporated into the cooking water. The cooking of the mixture of the ingredients can be accomplished by any one of a number of known cooking methods. For example, batch or continuous processing of the dough may be resorted to. Generally, the amount of water employed in cooking of the dough would be from 1 to 1 to 4 to 1 parts per parts of preblended ingredients. Cooking is carried out at temperatures of about 170° to 200° F. for a period of 5 to 60 minutes. Following cooking of the dough, popped popcorn is blended with the matrix and thoroughly distributed therein.

Subsequently, the popcorn-containing cooked dough is then shaped and formed either into the general shape desired for the end product or into a shape for permitting later additional shaping and forming. The popcorn-containing matrix may be extruded and sheeted, extruded and sliced, rolled into sheets and later cut and formed into desired shapes such as chips or otherwise processed to permit ease in handling as well as to provide shapes of different kinds which would be desired for the final snack food product.

The shaped and formed mixture is then cooled and dried to a moisture content of about 8 to 12 percent. During this part of the process, conditioning and/or tempering of the dough matrix may take place but it is apparent that conditioning and/or tempering may be done prior to shaping and forming the popped popcorn-containing dough matrix.

The dried, shaped and formed intermediate product may then be shipped and stored as such. Alternatively, the final step of the process may be carried out by immersing the intermediate product in an edible hot oil for brief periods of time to finish-cook and puff the product. The oil temperature may range from 350° to 425° F. and the time interval may range from 5 to 45 seconds. Alternatively, roasting, fluidized bed, and other methods of finish cooking the product may be used. Generally, deep fat frying is employed inasmuch as the flavor, texture and appearance characteristics appear to be very well developed with such technique.

Following deep fat frying, the snack food product, now having a moisture content of approximately 1 to 4 percent, is coated with salt or other flavor adjuncts, such as spices, sauces, condiments and he like. Such flavor adjuncts as well as foodstuff pieces may, however, also be blended into the dough matrix at the time the popcorn is incorporated therein.

In order to further illustrate the present invention, but in no way to limit it, the following illustrative example is given:

EXAMPLE

A dry mix is prepared in a ribbon mixer consisting of:

| | |
|---|---|
| Tapioca Flour | 29.4 pounds |
| Corn Flour (Unigel) | 29.4 pounds |
| Potato Starch (Redisol 313) | 29.4 pounds |
| Salt (Culinox 999) | 11.6 pounds |

Four and twenty-five hundredths pounds of the above mixture is combined with 10 pounds water, 42.5 grams of sodium bicarbonate and 156 grams of sucrose in a steam-jacketed sigma mixer. This is mixed for approximately 5 minutes prior to the application of 20 to 25 p.s.i.g. steam in the jacket. The mixture is cooked with agitation until it reaches 190° F. and the steam is then turned off.

Seven and forty-four hundredths pounds of ground popped popcorn is added to the gelatinous mixture. This is mixed for 10 minutes when a homogenous dough was obtained. This dough is extruded in an Ambrette extruder having a 1⅜-inch circular die. The extruded ropes are cut in 18-inch lengths, placed on racks and tempered at 70° F/50 percent R.H. overnight. The tempered ropes are sliced at 0.055-inch thickness and dried to 7 to 12 percent moisture. The dried slices are then expanded in hot oil (375° F.) for 25 seconds. The final moisture is 1 to 2 percent.

The product is then salted, packaged and placed in accelerated storage.

The following data was collected on one series of samples of product made according to the Example and another series of samples, Control, prepared generally according to the procedure of the Example except that sucrose and sodium bicarbonate were omitted. Both series of samples were stored at 100° F./30 percent R.H.

| Time (weeks) | Free fatty acid | | Peroxide value | | Carbonyl, mmols/g. | |
|---|---|---|---|---|---|---|
| | Control | Example | Control | Example | Control | Example |
| 4 | .16 | .10 | 18.3 | 4.9 | | |
| 5 | .26 | .07 | 7.4 | 2.9 | | |
| 7 | | | | | 11 | 5 |
| 10 | .75 | .15 | 11.0 | 2.5 | 95 | 31 |

After 2½ weeks' storage, the Control had a strong aroma and off-flavor, while the snack food product of the Example prepared pursuant to the invention was entirely acceptable.

While the foregoing invention has been described in conjunction with certain preferred embodiments, ingredients and processing conditions, it is apparent that a number of modifications may be made without departing from the spirit and scope of this invention as defined in the appended claims.

We claim:

1. A snack food product comprising a cooked food piece formed from a mixture of comminuted popped popcorn in a dough matrix containing tapioca flour, corn flour and potato starch, the ratio of popped popcorn to dough matrix being from about 1 to 1 to about 3 to 1 by weight, said matrix further containing sucrose and an alkali metal bicarbonate, the ratio of sucrose to dough matrix being from about 1 to 3 to about 1 to 10 by weight, and the ratio of alkali metal bicarbonate to dough matrix being from about 1 to 25 to about 1 to 50 by weight.

2. A snack food product as in claim 1, said product being deep fat fried.

3. A snack food product as in claim 2 in which the ratio of tapioca flour to corn flour to potato starch is about 1 to 1 to 1.

4. A process of preparing a snack food product which comprises forming a dough mixture containing tapioca flour, corn flour, and potato starch and water, adding sucrose and an alkali metal bicarbonate to said mixture, cooking said mixture to gelatinize the same, adding popped popcorn to said cooked dough mixture, shaping and forming the popped popcorn-containing cooked dough mixture, cooling, and drying said shaped and formed mixture to a moisture content of from about 8 to 12 percent, the ratio of sucrose to said dough mixture being from about 1 to 3 to about 1 to 10 by weight and the ratio of alkali metal bicarbonate to said dough mixture being from about 1 to 25 to about 1 to 50 by weight.

5. A process as in claim 4 in which shaping and forming are carried out by extruding and sheeting the popcorn-containing cooked dough mixture.

6. A process as in claim 4 in which shaping and forming are carried out by extruding and slicing the popcorn-containing cooked dough mixture.

7. A process as in claim 6 further comprising deep fat frying said dried, shaped and formed mixture.

8. A process for improving the stability of a snack food product comprising popped popcorn in a cooked dough matrix containing tapioca flour, corn flour and potato starch which comprises adding sucrose and an alkali metal bicarbonate to said dough matrix and deep fat frying said product, the ratio of sucrose to said cooked dough matrix being from about 1 to 3 to about 1 to 10 by weight and the ratio of alkali metal bicarbonate to said cooked dough matrix being from about 1 to 25 to about 1 to 50 by weight.

9. A process as in claim 8 in which the ratio of popped popcorn to said cooked dough matrix is from about 1 to 1 to about 3 to 1 by weight.

* * * * *